March 15, 1949.  W. CASTEDELLO  2,464,671
SHUTTER RELEASE DEVICE FOR PHOTOGRAPHIC CAMERAS
Filed June 7, 1945  2 Sheets-Sheet 1

WILLIAM CASTEDELLO
INVENTOR

BY Frederick E. Hane
ATTORNEY

March 15, 1949. W. CASTEDELLO 2,464,671
SHUTTER RELEASE DEVICE FOR PHOTOGRAPHIC CAMERAS
Filed June 7, 1945 2 Sheets-Sheet 2
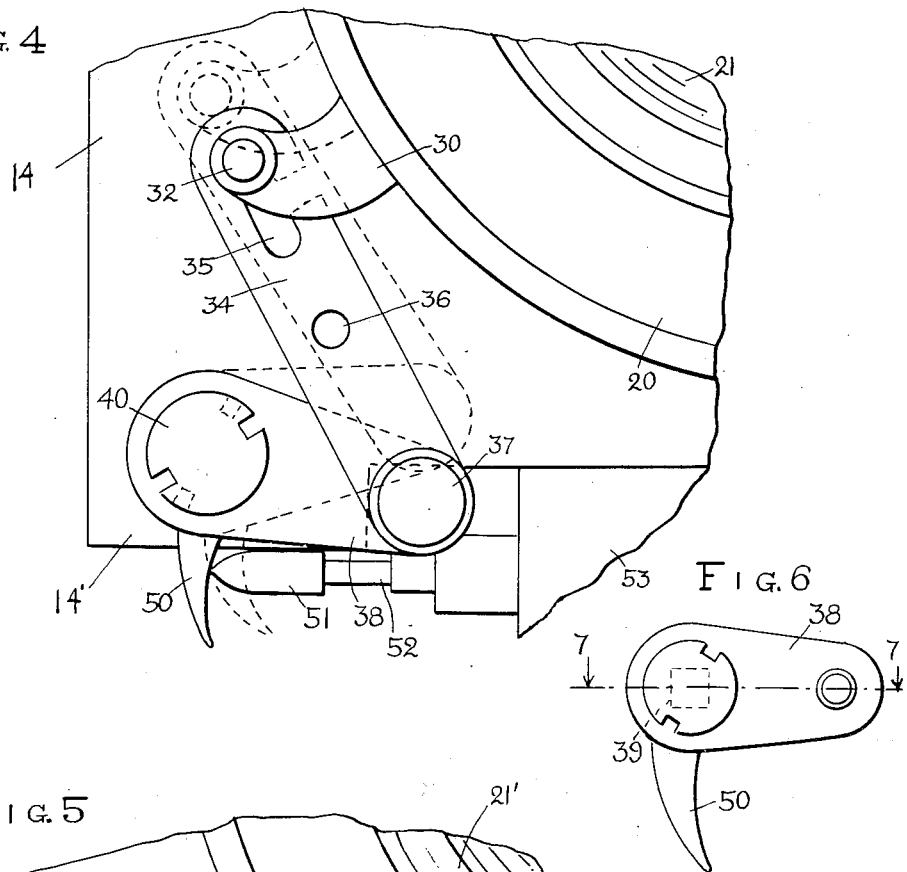
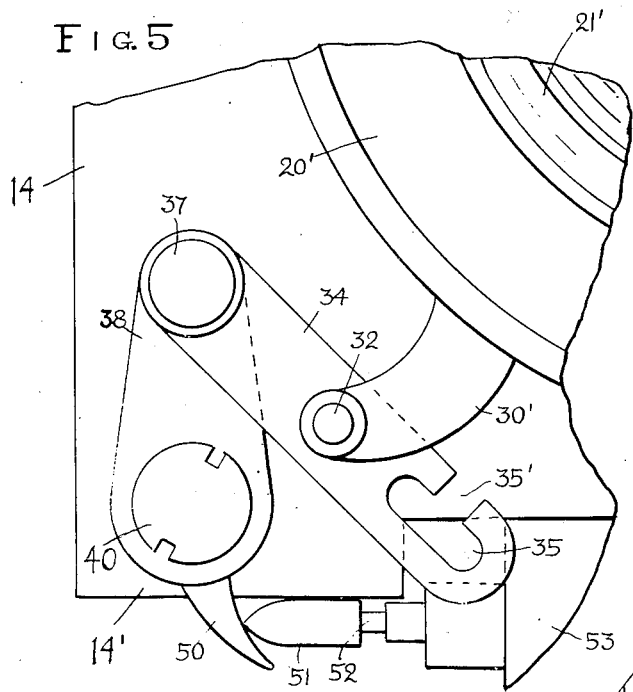
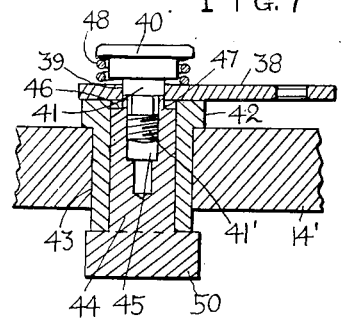
WILLIAM CASTEDELLO
INVENTOR
BY Frederick E. Hane
ATTORNEY Patented Mar. 15, 1949

2,464,671

UNITED STATES PATENT OFFICE 2,464,671

SHUTTER RELEASE DEVICE FOR PHOTOGRAPHIC CAMERAS

William Castedello, Stamford, Conn., assignor to The Kalart Company, Inc., Stamford, Conn.

Application June 7, 1945, Serial No. 598,019

12 Claims. (Cl. 95—53)

This invention relates to photographic cameras of a type in which the shutter with the lens is detachably mounted for permitting the use of lenses having different optical properties, particularly to photographic cameras in which the shutter release button can be operated by means of a solenoid actuated plunger.

In cameras of the type above described it has been found that the exchange of a shutter for another shutter offers certain difficulties since the location of the shutter release button with which the solenoid coacts often varies. As a consequence, the electromagnetic release of the shutter can be used only for shutters that have the release button in the same position while other shutters must be released by manual operation of the release button. Such manual release is often inconvenient since the release button is usually placed at the front of the camera where it is not always conveniently accessible when the camera is held in a position for operation.

Accordingly, it is an object of the invention to provide a novel and improved means for permitting a convenient exchange of the lens shutter for a shutter of a different type.

Another object of the invention is a novel and improved means permitting an electromagnetic operation of the lens shutter independent of the type of shutter and the location of the release button thereof.

Another object of the invention is a novel and improved design and arrangement of the shutter solenoid permitting an exchange of the lens shutter without requiring removal or disassembly of the solenoid.

Other and further objects, features and advantages of the invention will appear hereinafter and in the appended claims forming part of the application.

In the accompanying drawings a now preferred embodiment of the invention is shown by way of illustration and not by way of limitation.

Fig. 4 is a fractional view of the shutter release device according to the invention for a certain type of a shutter on an enlarged scale.

Fig. 5 is an enlarged view similar to Fig. 4 but showing the release device according to the invention in coaction with a shutter of a different type.

Fig. 6 is a plan view of part of the shutter release mechanism, and

Fig. 7 is a fractional section of Fig. 6 along line 7—7.

Figure 1:
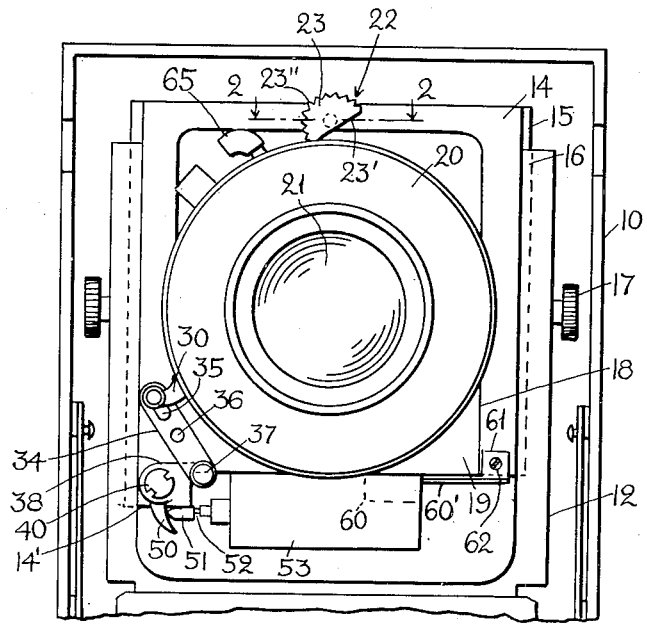
Fig. 1 is an elevational frontal view of part of a photographic camera of conventional design equipped with an exchangeable shutter and a shutter release device according to the invention.

The invention is shown in Fig. 1 in conjunction with a conventional photographic camera. Only those parts of the camera are shown and described which are essential for the understanding of the invention. It should be noted in this connection that the application of the invention is not limited to the camera type as shown but may be advantageously used in conjunction with any camera in which the shutter with the lens is detachably mounted and the shutter release button can be operated by means of a solenoid actuated plunger.

Referring now to Fig. 1 in detail, the camera shown in this figure comprises a casing 10 with a lens bed (not shown). The camera bed supports a standard 12 which is mounted on the camera bed in a conventional manner for movement relative to the camera bed. The mounting of standard 12 and the gear drive are not shown being of conventional design and not part of the invention. The standard 12 supports a substantially rectangular plate 14 which may be described as forming part of the standard and is guided in standard 12, for instance by means of a dovetail as indicated at 15 and 16. The plate 14 can be raised or lowered relative to standard 12. Set screws 17 serve to arrest plate 14 in any desired position. Plate 14 has a central opening 18 in which is fitted a lens board 19 to which is fastened a shutter 20 with a lens 21. The standard is connected to the casing by a bellows (not shown).

The camera parts hereinbefore described are conventional and not part of the invention.

Figure 2:
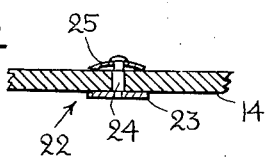
Fig. 2 is a fractional section along line 2—2 of Fig. 1.
Figure 3:
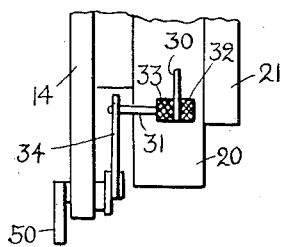
Fig. 3 is a fractional side view of Fig. 1.

The lens board with the shutter is detachably secured in its position in plate 19 by means of a locking device generally designated 22. This locking device, as can be best seen in Fig. 2, comprises a disc 23 flattened at its side 23' and knurled or serrated at its periphery 23". Disc 23 is fastened to a pin 24 passed through the upper side of plate 14. The protruding end of pin 24 supports a spring washer 25 or any other suitable springy means permitting a rotation of disc 23 under tension. The locking device 22 is mounted on plate 14 so that in one position of disc 23 the flat side 23' thereof is substantially parallel to the upper end of lens board 19 thereby permitting a detachment of lens board 19 with the shutter from plate 14 by simply lifting the lens board out of the plate. In order to secure the lens board in the plate, it is only necessary to turn disc 23 into the position shown in Fig. 1 or into a similar position in which part of disc 23 extends over the edge of lens board 19 thereby locking the lens board to plate 14.

The shutter 20 is equipped with a release button 30 which can be manually operated or by means of an electromagnet arrangement. The electromagnet arrangement comprises a solenoid actuating a linkage system which can be operatively coupled with the release button for operation thereof. The release button 30 can be operatively coupled with the linkage system by any suitable means such as a pin 31 which may be fastened to release button 30 by two knurled screws 32 and 33. This pin engages the linkage system of the electromagnetic release arrangement which will now be described in detail.

The linkage system comprises an arm 34 which has near one end an elongated slot 35 with an exit slot 35', leading into elongated slot 35. Arm 34 is further provided with one or more holes 36. The width of slots 35, 35' and the diameter of hole 36 are so selected that they can be easily engaged by pin 31. Arm 34 is pivoted at a pivot 37 to one end of a lever 38 having a square hole 39 near its other end. This square hole is engaged by a screw 40 having a cylindrical section 41. The diameter of the cylindrical section is so selected that lever 38 can rotate relative to screw 40. Lever 38 and screw 40 are supported by a sleeve 42 fitted into a corresponding hole 43 provided in an extension 14' of plate 14. Sleeve 42 also serves as bearing for a pin 44 mounted rotatably therein. The end of pin 44 opposite to screw 40 has a blind hole 45 which is engaged by a threaded extension 41' of screw 40 thereby screwing screw 40 and pin 44 together. The above mentioned end of pin 44 is set off at 46 and has a square extension 47 which just fits into square hole 39. The axial length of extension 47 is so selected that this extension penetrates only through part of the thickness of lever 38. The remaining part of the thickness of lever 38 is occupied by the cylindrical extension 41 of screw 40 when the various parts are in the position shown in Fig. 7. A coil spring 48 abutting against a shoulder of screw 40 and against lever 38 urges the above described parts into the position shown in Fig. 7. Integral with the lower end of pivot 44 or fastened thereto is a pawl 50, the shape of which may be best seen in Figs. 4 or 5.

As will be obvious from an examination of the drawings and description, an angular movement of pawl 50 will be transmitted to lever 38 through the square extension 47 engaging the square hole 39 of lever 38 when the parts are in the position shown in Fig. 7 while screw 40 will remain stationary due to the cylindrical shape of extension 41. Furthermore, the possible angular position of pawl 50 relative to lever 38 is limited to certain positions, to wit four positions in which square extension 47 can engage the square hole 39. In order to place lever 38 in a selected one of the four possible relative positions, screw 40 is depressed against the action of coil spring 48 thereby forcing pin 44 with pawl 50 to make a downward axial movement in sleeve 42. By this downward movement square section 47 is moved out of engagement with square hole 39 which is now solely occupied by cylindrical extension 41. Lever 38 can then be rotated relative to pawl 50 and as soon as the selected relative position of lever and pawl is reached, screw 40 is released whereupon coil spring 48 returns the various parts into the position shown in Fig. 7. Lever 38 and pawl 50 are now placed in a new fixed angular position relative to each other. Pawl 50 coacts with the plunger head 51 of a plunger 52 actuated by a solenoid 53. Plunger 52 is mounted within solenoid 53 in such a position relative to the solenoid that the plunger head will be pushed against pawl 50 when solenoid 53 is energized thereby rotating pawl 50 in a clockwise direction in the embodiment of the invention illustrated in the drawings. Solenoid 53 is connected to any suitable source of current such as a battery, usually placed in a battery compartment in the camera casing. Since the connection between solenoid and battery is conventional and not part of the invention, it is not shown in the drawings. The solenoid circuits can be controlled by means of a conventional push button (not shown) which in its function corresponds to release button 30. The solenoid is mounted on the plate 14 by any suitable means such as bracket 60 fastened to solenoid 53 and having an arm 60' with extension 61 secured to plate 14 by a screw 62. If desired, a second bracket may be provided at the other end of solenoid 53. Consequently, plate 14 can be moved relative to standard 12, and lens board 19 can be detached without requiring a removal of the solenoid. As will be best seen in Fig. 1, the solenoid is placed in the space left between standard 12 and the lower edge of plate 14 so that the solenoid does not protrude substantially beyond standard 12 in the direction of a movement of the lens shutter and hence does not prevent a closing of the camera. Due to the mounting of the pawl and the linkage system on the plate extension 14' the space required for the solenoid and the parts coacting therewith is reduced to a minimum.

Let it now be assumed that a shutter 20 having a manual release button 30 located as shown in Figs. 1 and 4 is inserted in the camera, that arm 34 and lever 38 are in the relative position shown in Fig. 1 and in dotted lines in Fig. 4, and that pin 31 engages the upper edge of elongated slot 35. When it is now desired to operate the camera shutter after the shutter has been wound in the usual manner by means of a shutter winding knob 65, the solenoid circuit is closed by means of the push button. As a result, plunger head 51 will push pawl 50 in a clockwise direction. This angular movement of pawl 50 is transmitted to arm 34 through lever 38 and the release button 30 is pulled downward until all parts assume the position shown in Fig. 4 in full lines. This downward movement of release button 30 which simulates a manual release movement causes a tripping of the shutter. As soon as the solenoid 53 is deenergized plunger 52 will return into its inactive position and release button 30 will pull the parts of the linkage system back into the positions shown in dotted lines. As can be best seen in Fig. 4 the angular position of lever 38 and arm 34 and the lengths thereof are so adjusted that pin 31 will engage the upper end of elongated slot 35. In other words, the parts of the linkage system are placed in a relative position in which they are operative for a shutter with a release button 30 located as shown in Figs. 1 and 4.

Let it be now assumed that the shutter shown in Figs. 1 and 4 is exchanged for a shutter 20' having a release button 30' located as shown in Fig. 5. In order to adapt the linkage system to the new push button position, lever 38 is turned from its angular position relative to pawl 50 as shown in Fig. 4 into the relative angular position as shown in Fig. 5. This adjustment of the relative angular positions of pawl 50 and lever 38 is accomplished by manipulation of screw 40 as has been explained in connection with Fig. 7. Furthermore, arm 34 is swung into the position shown in Fig. 5 and pin 31 is slipped into hole 36. As will now be obvious, an actuation of plunger 52 will cause a rotation of lever 38 in a clockwise direction whereby arm 34 pushes release button 30' in a direction for release.

As will appear from the previous description and an examination of the drawings, the means of adjusting the relative angular position of pawl 50 and lever 38 and the provision of elongated slot 35 and hole 36 permit the adaptation of the linkage system to a substantial number of release button positions. It will be understood that the number of possible linkage positions can be substantially increased by providing a plurality of holes 36 or elongated slots 35 and also by providing a polygon such as a hexagon instead of square extension 41. In practice the number of required different linkage positions is not very substantial since the number of different release button locations is a limited one.

It will of course be understood that the dimensions of the linkage members must be suitably selected to serve the purpose. It is also possible to provide a hole instead of the elongated slot 35 having an exit slot 35' or an elongated slot instead of hole 36.

It is only essential for the invention to provide a linkage system which can be adapted to different shutter release button positions and conveniently be operatively connected with a release button and detached therefrom. It is also essential for the invention to design and place the solenoid actuating the linkage system so that it occupies a minimum space and does not have to be partly or completely disassembled when the shutter is exchanged.

While the invention has been described in detail with respect to a certain now preferred example and embodiment of the invention it will be understood by those skilled in the art after understanding the invention, that various changes and modifications may be made without departing from the spirit and scope of the invention and it is intended therefore to cover all such changes and modifications in the appended claims.

What is claimed as new and desired to be secured by Letters Patent is:

1. Shutter release device for photographic cameras of the type described comprising a solenoid with a plunger actuated thereby, a means for supporting the solenoid and the plunger on the camera, a linkage system comprising a plurality of coacting links supported on the camera, one of said links having a plurality of openings, each adapted to be engaged by the release button at the shutter for operatively coupling the linkage system with the shutter release button, the location of the engaged opening determining the effective length of the coupling link, said coupling link being pivotally connected to one link of a pair of pivotally connected links of the linkage system, the other link of said pair being arranged to be displaced by said plunger for transmitting a plunger movement to the shutter release button thereby actuating the shutter, a means for supporting said pair of links on the camera, and a means for securing the two links of the pair in a selected one of several predetermined angular positions relative to each other, whereby the linkage system can be adjusted corresponding to the shutter release button position.

2. Shutter release device as described in claim 1 in which the two links of the pair of links are mounted on a common pivot, and in which a means is provided for securing the two links on said pivot in the selected one of several predetermined angular positions relative to each other.

3. Shutter release device as described in claim 1 in which one of the two links of the pair of links has an unround hole and the other link is mounted on a pivot supported on the camera and arranged to engage said unround hole for securing the said links in a fixed angular position relative to each other determined by the configuration of said hole, and in which a means is provided for moving said pivot out of engagement with the hole thereby permitting a change of the relative angular position of the two links.

4. In a shutter release device for a photographic camera having a casing, a standard mounted for movement relative to the casing, and a shutter with lens having a release button at the shutter detachably mounted on the standard, the combination of a solenoid with a plunger actuated thereby, a means for supporting the solenoid and the plunger by the standard, a linkage system comprising a plurality of connected links supported on the standard, one of said links having a plurality of openings each adapted to be engaged by the release button at the shutter for operatively coupling the linkage system with the shutter release button, the position of the engaged opening determining the effective length of the coupling link, said coupling link being pivotally connected to one link of a pair of links, the other link of said pair being arranged to be displaced by said plunger for transmitting a plunger movement to the shutter release button thereby actuating the shutter, a pivot mounted on the standard for supporting said pair of links, and means associated with the pivot for securing the two links of the pair in a selected one of several predetermined angular positions relative to each other, whereby the linkage system can be adjusted corresponding to the shutter release button position.

5. In a shutter release device for a photographic camera having a casing, a standard mounted for movement relative to the casing, and a shutter with lens having a release button at the shutter detachably mounted on the standard, the combination of a solenoid with a plunger actuated thereby, a means for supporting the solenoid and the plunger on the standard, a linkage system comprising a plurality of links supported on the standard, one of said links having a plurality of slots each adapted to be engaged by the release button at the shutter for operatively coupling the linkage system with the shutter release button, the position of the engaged slot determining the effective length of the coupling link, said coupling link being pivotally connected to one link of a pair of links, the other link of said pair being arranged to coact with said plunger for transmitting a plunger movement to the shutter release button thereby actuating the shutter, a pivot mounted on the standard for supporting said pair of links, one of the two links having an unround hole and the other link being mounted on the pivot, said pivot being arranged to engage the unround hole for securing the said links in one of several predetermined angular positions relative to each other, each position being determined by the configuration of said hole, and a means for moving said pivot out of engagement with the hole and into a different angular position relative to the other link of the pair, whereby the linkage system can be adjusted corresponding to the release button position at the shutter.

6. Shutter release device as described in claim 5 in which said pivot has an unround portion capable of engaging the unround hole in several predetermined positions, and in which said pivot moving means includes a portion capable of rotating freely in said unround hole when the pivot is moved out of engagement with the unround hole by the said moving means.

7. In a shutter release device as described in claim 5 the combination of a pivot having an unround portion capable of engaging the unround hole in several predetermined positions, a pivot moving means including a portion shaped to rotate freely in said unround hole when the pivot is moved out of engagement with the unround hole by the said moving means, and a spring means urging the pivot and the pivot moving means into positions in which the unround pivot portion engages the unround hole thereby securing the said two links in one of several predetermined fixed positions relative to each other.

8. A shutter release device as described in claim 5 in which an extension is provided at the release button capable of detachably engaging one of said openings of the coupling link.

9. Shutter release device for photographic cameras of the type described with detachable shutter comprising electromagnetic means including a plunger for actuating the shutter release button at the shutter in response to a plunger movement, and a linkage system including a first link arranged to be operatively coupled with the shutter release button, a second link arranged to be displaced by the plunger for transmitting a plunger movement to the shutter release button thereby releasing the shutter, an intermediate third link pivoted to the first link and to the second link, and locking means for securing the second link and the third link in one of several predetermined angular positions relative to each other for adapting the linkage system to different predetermined release button positions.

10. Shutter release device as described in claim 9, wherein the first link has a variable effective length.

11. A shutter release device as described in claim 9, wherein said first link includes a plurality of spaced openings each adapted to be engaged by the release button at the shutter for varying the effective length of the said first link corresponding to the release button position.

12. In a shutter release device for photographic cameras having a casing, a standard mounted for movement relative to the casing, and a shutter with lens having a release button at the shutter detachably mounted on the standard, the combination of a solenoid including a plunger supported on the standard for actuating the release button in response to a plunger movement, and a linkage system including a first link arranged to be operatively coupled with the shutter release button, a second link arranged to be displaced by the plunger for transmitting a plunger movement to the shutter release button, thereby releasing the shutter, an intermediate third link pivoted to the first link and to the second link, and locking means for securing the second link and the third link in one of several predetermined angular positions relative to each other for adapting the linkage system to different predetermined shutter release button positions.

WILLIAM CASTEDELLO.

REFERENCES CITED

The following references are of record in the file of this patent:

UNITED STATES PATENTS

| Number | Name | Date |
| --- | --- | --- |
| 624,693 | Sheffield | May 9, 1899 |
| 1,178,474 | Becker | Apr. 4, 1916 |
| 1,185,337 | McCartney | May 30, 1916 |
| 2,176,573 | Hershberg | Oct. 17, 1939 |
| 2,213,749 | Strauss | Sept. 3, 1940 |
| 2,308,725 | Steiner | Jan. 19, 1943 |

FOREIGN PATENTS

| Number | Country | Date |
| --- | --- | --- |
| 704,100 | Germany | Mar. 22, 1941 |